US012756165B2

(12) United States Patent
Yaguchi

(10) Patent No.: US 12,756,165 B2
(45) Date of Patent: Oct. 6, 2026

(54) DEVICE AND METHOD FOR FORMING A NOTCH FOR STRIPPING

(71) Applicant: Yazaki Corporation, Tokyo (JP)

(72) Inventor: Naoya Yaguchi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 290 days.

(21) Appl. No.: 18/731,617

(22) Filed: Jun. 3, 2024

(65) Prior Publication Data

US 2025/0015571 A1 Jan. 9, 2025

(30) Foreign Application Priority Data

Jul. 6, 2023 (JP) ................................ 2023-111456

(51) Int. Cl.
*H02G 1/12* (2006.01)
*G01V 3/02* (2006.01)

(52) U.S. Cl.
CPC .............. *H02G 1/127* (2013.01); *G01V 3/02* (2013.01); *H02G 1/1256* (2013.01); *H02G 1/1265* (2013.01)

(58) Field of Classification Search
CPC .... H02G 1/1256; H02G 1/1265; H02G 1/127; G01V 3/02
See application file for complete search history.

(56) References Cited

U.S. PATENT DOCUMENTS

| | | | | |
|---|---|---|---|---|
| 11,705,699 B2 * | 7/2023 | Okazaki | H02G 1/1265 83/870 |
| 12,525,772 B2 * | 1/2026 | Yaguchi | H02G 1/1253 |
| 2022/0239078 A1 * | 7/2022 | Sorg | H02G 1/127 |
| 2025/0007259 A1 * | 1/2025 | Yaguchi | H02G 1/1256 |

FOREIGN PATENT DOCUMENTS

| | | | |
|---|---|---|---|
| JP | 2000-350324 A | 12/2000 | |
| JP | 2000354315 A * | 12/2000 | |
| JP | 2021151108 A * | 9/2021 | H02G 1/1268 |
| WO | WO-2013183120 A1 * | 12/2013 | H02G 1/1256 |

* cited by examiner

*Primary Examiner* — Ryan J. Walters
(74) *Attorney, Agent, or Firm* — Sughrue Mion, PLLC

(57) ABSTRACT

Each of cutting mechanisms of a device for forming a notch for stripping includes: an electrically conductive notch forming cutter blade; a contact detecting section configured to detect a contact between an outermost conductor of a coated electric wire and the notch forming cutter blade based on a current through an electric circuit including a power supply connecting part, the outermost conductor and the notch forming cutter blade; and a notch forming movement mechanism configured to move the notch forming cutter blade in an intersection direction intersecting an outer circumferential surface, wherein upon detecting the contact by the contact detecting section during movement of the notch forming cutter blade, the notch forming movement mechanism is configured to adjust a position of the notch forming cutter blade in the intersection direction and position the notch forming cutter blade to a position corresponding to a specified notch depth for forming notches therein.

5 Claims, 6 Drawing Sheets

DEVICE AND METHOD FOR FORMING A NOTCH FOR STRIPPING

BACKGROUND OF THE INVENTION

Technical Field

The present invention relates to a device and a method for forming a notch for stripping in which the notch is formed starting from an outer circumferential surface of a coated electric wire for stripping the coated electric wire.

Background Art

As one of conventional processes for processing terminals of coated electric wires, a stripping process is widely used in which a coating is removed to expose an internal conductor such as a core. Furthermore, a device for forming a notch for the stripping is known which forms a notch in the coated electric wire starting from its outer circumferential surface to make a stripped region removable (see e.g. Patent Document 1). Such a type of device for forming a notch for stripping according to Patent Document 1 includes a pair of V-shaped cutter blades which is configured to clamp a coated electric wire therebetween so as to intrude into the outer circumferential surface and to be then rotated around an electric wire axis of the coated electric wire in order to form the notch for stripping.

CITATION LIST

Patent Literature

Patent Document 1: JP 2000-350324 A

SUMMARY OF THE INVENTION

Coated electric wires include a thick electric wire which includes a plurality of layers of coating materials arranged around a core and layered on each other, such as an inner coating, a braid, a metal foil, and an outer coating. In many cases, this type of device for forming a notch for stripping is configured such that the electric wire axis is used as a reference for movement of the V-shaped cutter blades to clamp the coated electric wire by the V-shaped cutter blades, wherein target positions to be reached by the V-shaped cutter blades are determined as a distance from the electric wire axis. Then, the V-shaped cutter blades are moved toward the electric wire axis to clamp the coated electric wire so that the V-shaped cutter blades intrude into it to a notch depth corresponding to the determined target positions. For example, in the case of forming a notch in a thick electric wire as mentioned above, the target positions for the V-shaped cutter blades are determined as a distance from the electric wire axis which is obtained by subtracting a thickness of a coating material to be removed from a sum of a radius of a core and individual thicknesses of the plurality of layers of coating materials. In the case of a thick electric wire, a tolerance in the target positions for the V-shaped cutter blades with the electric wire axis as the reference tend to be large because this tolerance is an accumulated tolerance obtained from a tolerance of the core radius and a tolerance of a thickness of a coating material(s) which is different from the removed coating material. This may result in a low accuracy for movement of the V-shaped cutter blades. For example, in the case of forming a notch in a thick electric wire to a desired coating material included therein, the notch may be formed to a too large depth due to a low accuracy for movement of the V-shaped cutter blades so that the notch may extend into a more inner coating material to be kept untouched. A too shallow notch may be also formed so that the notch may be insufficient for stripping.

Furthermore, many of coated electric wires are wound around bobbins for storage. During such storage, the core and/or coating may be deformed and flattened due to load by the own weight, or misalignment may occur in which the electric wire axis may be offset from a center of the coated electric wire. When notch forming is applied to a coated electric wire with such deformation and/or misalignment by the above type of device for forming a notch for stripping, rotation of the pair of V-shaped cutter blades around the electric wire axis may result in a varying notch depth obtained by the cutter blades in a direction around the electric wire axis. As a result, the obtained notch may be too deep in some region along the direction around the electric wire axis so that a more inner portion to be untouched may be cut in, wherein the notch may be too shallow in some other region along the direction around the electric wire axis so that the electric wire may be cut in only insufficiently.

Thus, the above-mentioned type of device for forming a notch for stripping, namely a device with a pair of V-shaped cutter blades which clamp a coated electric wire and are then rotated around the electric wire axis, has the problem that an accuracy for notch forming may be reduced when forming a notch in a thick electric wire and a coated electric wire wound around a bobbin for storage.

Therefore, the present invention is focused on the above problem, and an objective of the present invention is to provide a device and a method for forming a notch for stripping which enables an accuracy for notch forming to be improved in the case of forming a notch in a thick electric wire and/or a coated electric wire wound around a bobbin for storage.

In order to achieve the above-mentioned objective, a device for forming a notch for stripping includes: one or more cutting mechanisms including one or more notch forming mechanism parts, with one of the one or more notch forming mechanism parts being associated to each of the one or more cutting mechanisms, wherein the one or more notch forming mechanism parts are configured to be arranged around an electric wire axis of a coated electric wire, wherein the coated electric wire includes a core covered with an insulating layer or covered with the insulating layer and one or more conductive layers, wherein the one or more conductive layers are layered inside the insulating layer, wherein each of the one or more cutting mechanisms is configured to form one or more notches in the coated electric wire to a specified notch depth starting from an outer circumferential surface of the coated electric wire by means of a respective one of the one or more notch forming mechanism parts; and a rotation mechanism configured to rotate the one or more notch forming mechanism parts around the electric wire axis and thus extend the one or more notches in a direction around the electric wire axis in a state of the one or more notch forming mechanism parts which have formed the one or more notches in the coated electric wire, which makes a stripped region corresponding to the notch depth removable; and a power supply connecting part which is configured to connect a power supply to an outermost conductor in the coated electric wire in a connecting position located on a side of the coated electric wire closer to its tip than a notch forming position of the coated electric wire for forming the one or more notches therein by the one or more cutting mechanisms, the outermost conductor being located at a smallest depth from the outer circumferential surface in the coated electric wire; wherein each of the one or more cutting mechanisms includes: an electrically conductive notch forming cutter blade which is movable in an intersection direction intersecting the outer circumferential surface; a contact detecting section configured to detect a contact between the outermost conductor and the notch forming cutter blade based on a current through an electric circuit including the power supply connecting part, the outermost conductor and the notch forming cutter blade; and a notch forming movement mechanism configured to move the notch forming cutter blade in the intersection direction, wherein upon detecting the contact by the contact detecting section during movement of the notch forming cutter blade, the notch forming movement mechanism is configured to adjust a position of the notch forming cutter blade in the intersection direction and position the notch forming cutter blade to a position corresponding to the notch depth for forming one or more notches therein.

In order to achieve the above-mentioned objective, the present invention also provides a method for forming a notch for stripping including: a preparation step of placing the coated electric wire in the device as described above and positioning the notch forming cutter blade in an initial position by means of the device, wherein the initial position is spaced away from the outer circumferential surface in the intersection direction; a power supply connecting step of connecting the power supply to the outermost conductor on the side of the coated electric wire closer to its tip by means of the power supply connecting part; a first notch forming step of moving the notch forming cutter blade until the contact between the notch forming cutter blade and the outermost conductor is detected based on the current; upon detecting the contact by the contact detecting section during movement of the notch forming cutter blade according to the first notch forming step, a second notch forming step of adjusting the position of the notch forming cutter blade in the intersection direction and positioning the notch forming cutter blade to a position corresponding to the notch depth for forming one or more notches therein; and a rotation step of rotating the one or more notch forming mechanism parts around the electric wire axis and thus extending the one or more notches in the direction around the electric wire axis in the state of the one or more notch forming mechanism parts which have formed the one or more notches in the coated electric wire, which makes the stripped region removable.

With the device and method for forming a notch for stripping, it is possible to improve the accuracy for notch forming in the case of forming a notch in a thick electric wire and/or a coated electric wire wound around a bobbin for storage.

DETAILED DESCRIPTION OF PREFERRED EMBODIMENTS

Hereinafter, embodiments of a device and a method for forming a notch for stripping will be described.

Figure 1:
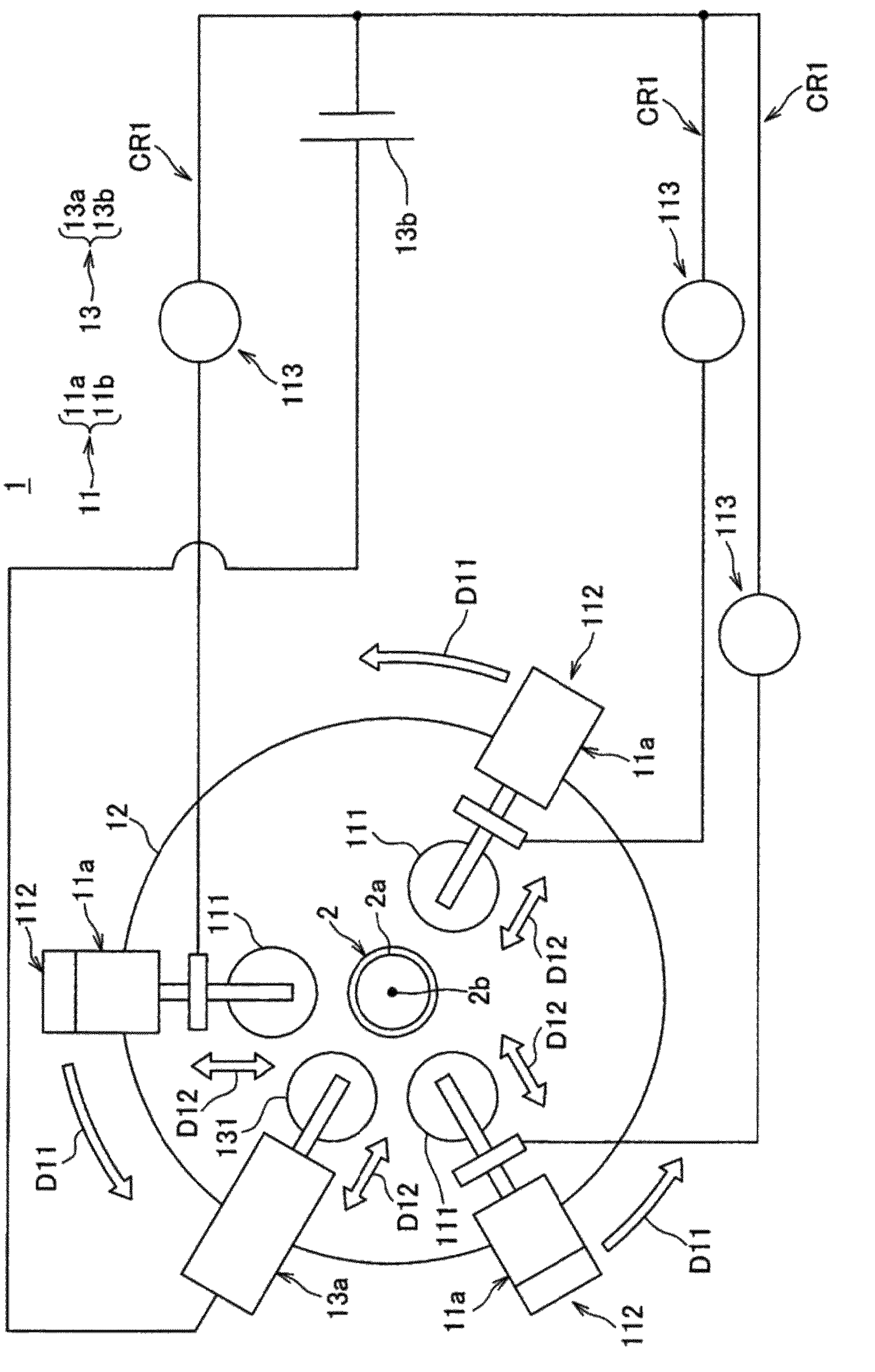
FIG. 1 shows a schematic view of a device for forming a notch for stripping according to an embodiment.
Figure 2:
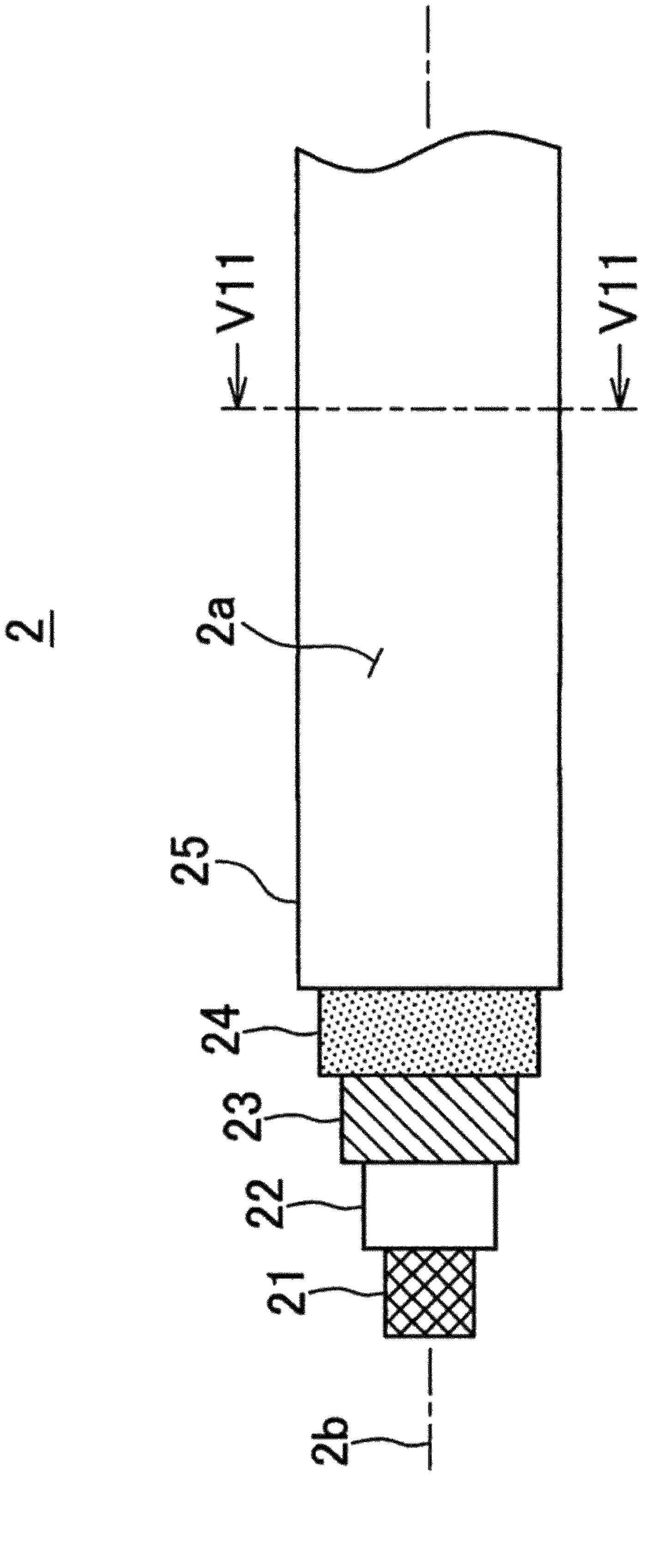
FIG. 2 shows a schematic view of a coated electric wire to which notch forming may be applied by the device for forming a notch for stripping as shown in FIG. 1.
Figure 3:
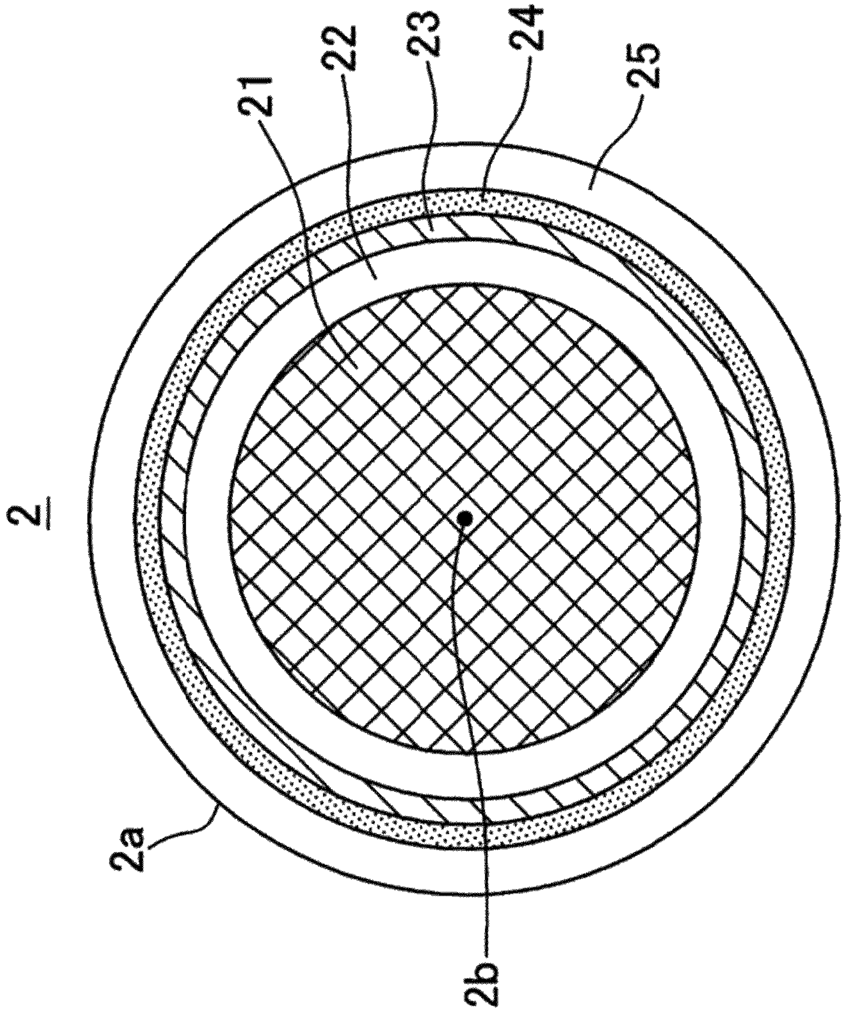
FIG. 3 shows a sectional view of the coated electric wire according to FIG. 2 along the line V11-V11 as shown in FIG. 2.

FIG. 1 shows a schematic view of a device for forming a notch for stripping according to an embodiment. FIG. 2 shows a schematic view of a coated electric wire to which notch forming may be applied by the device for forming a notch for stripping as shown in FIG. 1, and FIG. 3 shows a sectional view of the coated electric wire according to FIG. 2 along the line V11-V11 as shown in FIG. 2.

First, a coated electric wire 2 for which notch forming is applied according to the present embodiment is a thick electric wire including a plurality of layers of coating materials and a conductive core 21 covered with the plurality of layers of coating materials. This coated electric wire 2 is wound around a bobbin for storage and used e.g. for a high-voltage wire harness for an automobile. As the coating materials, the coated electric wire 2 includes an inner coating 22 made of an insulating resin as an insulating layer, a braid 23 as a conductive layer, a metal foil 24 as a conductive layer, and an outermost coating 25 made of an insulating resin as an insulating layer. For processing a terminal of the coated electric wire 2, the device 1 for forming a notch for stripping is configured to form one or more notches to a specified notch depth starting from an outer circumferential surface 2*a* of the coated electric wire 2, whereby a stripped region corresponding to the notch depth is removable.

For example, notch forming as described below is possible: For example, a notch forming process is possible in which a depth extending to an inner circumference of the metal foil 24 is specified as the notch depth so that the outermost coating 25 and the metal foil 24 are defined as the stripped region, wherein one or more notches extending to the inner circumference of the metal foil 24 are formed. In this example, after stripping, the braid 23 will be exposed at a terminal of the coated electric wire 2, the braid 23 accommodating the inner coating 22 and core 21 therein. Furthermore, as another example, a notch forming process is possible in which a depth extending to an inner circumference of the inner coating 22 is specified as the notch depth so that all coating materials other than the core 21 are defined as the stripped region, wherein one or more notches extending to the inner circumference of the inner coating 22 are formed. In this example, after stripping, the core 21 will be exposed at the terminal of the coated electric wire 2.

The device 1 for forming a notch for stripping is capable of forming such a notch in the coated electric wire 2, and includes three cutting mechanisms 11 and a rotation mechanism 12. Three cutting mechanisms 11 are provided so as to include a plurality of notch forming mechanism parts 11*a* (three notch forming mechanism parts 11*a* in the present embodiment) in a one-to-one manner, i.e., one of the notch forming mechanism parts 11*a* is associated to each of the cutting mechanisms 11, wherein the notch forming mechanism parts 11*a* are disposed around an electric wire axis 2*b* of the coated electric wire 2. The cutting mechanisms 11 are each configured to form one or more notches to a specified notch depth starting from the outer circumferential surface 2*a* of the coated electric wire 2 by means of the respective notch forming mechanism parts 11*a*. In the present embodiment, the three notch forming mechanism parts 11*a* of the cutting mechanisms 11 are arranged and spaced from each other at an angle of 120° around the electric wire axis 2*b*. The rotation mechanism 12 is configured to rotate the three notch forming mechanism parts 11*a* in a cutting rotating direction D11 around the electric wire axis 2*b* and thus extend the one or more notches in the cutting rotating direction D11 around the electric wire axis 2*b* in a state of the notch forming mechanism parts 11*a* which have formed the one or more notches in the coated electric wire 2. In the present embodiment, the rotation mechanism 12 rotates the three cutting mechanisms 11 by an angle greater than or equal to 120° in the cutting rotating direction D11 around the electric wire axis 2*b*. This rotation connects the notches at three locations in the direction around the electric wire axis 2*b* to obtain one notch extending over the entire circumference of the coated electric wire 2, whereby the stripped region corresponding to the specified notch depth is removable. In addition, the power supply connecting part 13 is configured to connect the power supply 13*b* to an outermost conductor by means of a single power supply mechanism part 13*b*, wherein the outermost conductor is located at a smallest depth from the outer circumferential surface 2*a* in the coated electric wire 2.

In the device 1 for forming a notch for stripping, the three cutting mechanisms 11 are configured identically, including the notch forming mechanism parts 11*a*. Hereinafter, configurations of the cutting mechanisms 11 and the single power supply mechanism part 13*a* will be described, wherein the single power supply mechanism part 13*a* is the only one which is originally provided.

Figure 4:
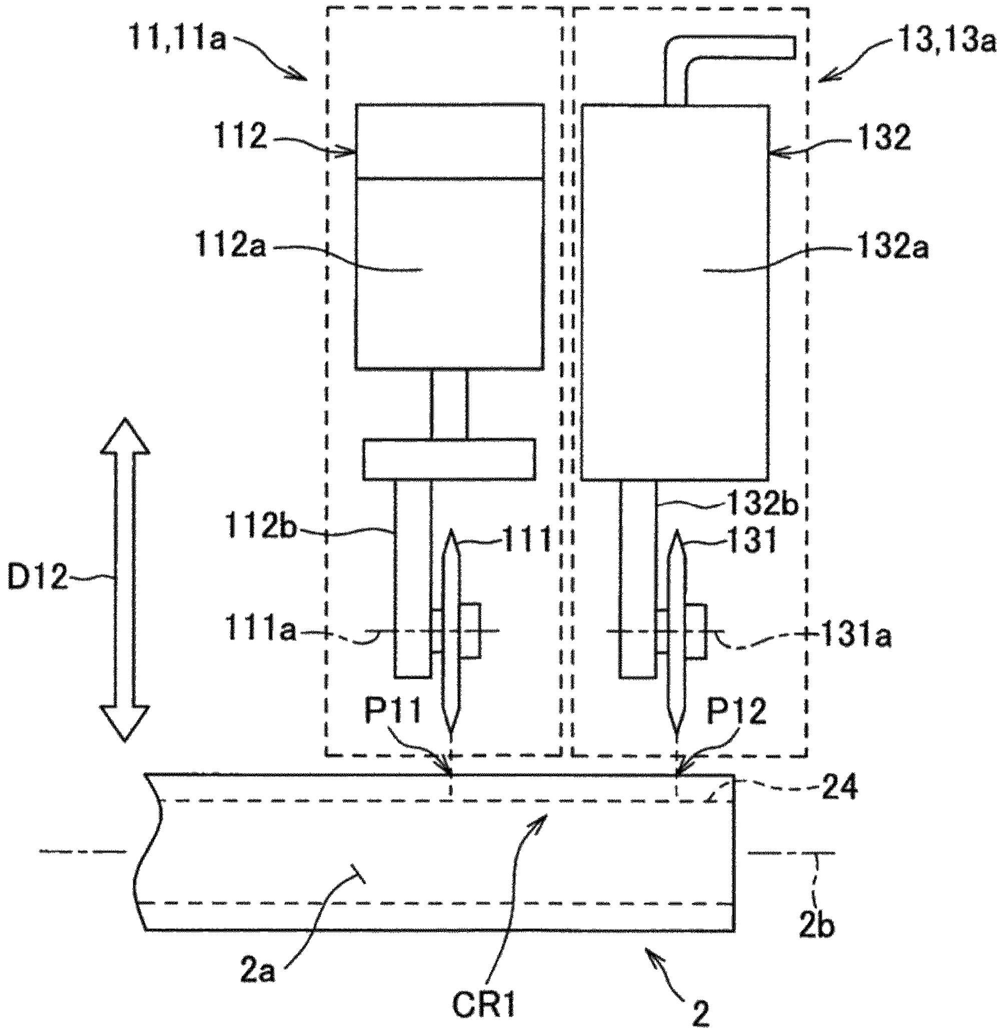
FIG. 4 shows a schematic side view of a notch forming mechanism part of a cutting mechanism and a power supply mechanism part of a power supply connecting part according to FIG. 1 as viewed in a cutting rotating direction.

FIG. 4 shows a schematic side view of a notch forming mechanism part of a cutting mechanism and a power supply mechanism part of a power supply connecting part according to FIG. 1 as viewed in a cutting rotating direction.

As shown in FIGS. 1 and 4, the cutting mechanism 11 includes a notch forming cutter blade 111, a notch forming movement mechanism 112, and a contact detecting section 113, the notch forming cutter blade 111 and notch forming movement mechanism 112 forming a notch forming mechanism part 11*a*. The contact detecting section 113 is configured to detect contact between the outermost conductor of the coated electric wire 2 and the notch forming cutter blade 111. In the present embodiment in which notch forming is applied to the coated electric wire 2 as shown in FIGS. 2 and 3, the outermost conductor is the metal foil 24.

The cutter blade 111 is an electrically conductive and disc-shaped cutting element which is movable in an intersection direction D12 intersecting the outer circumferential surface 2*a* of the coated electric wire 2. According to the present embodiment, the movement mechanism 112 includes a cutter frame 112*b* as described below, wherein the cutter blade 111 is mounted to the cutter frame 112*b* such that the cutter blade 111 is pivotable around a cutter axis 111*a* which extends along the electric wire axis 2*b* and intersects the intersection direction D12.

The notch forming movement mechanism 112 is configured to move the notch forming cutter blade 111 in the intersection direction D12. Furthermore, when contact between the notch forming cutter blade 111 and the metal foil 24 is detected by the contact detecting section 113 during movement of the notch forming cutter blade 111, the notch forming movement mechanism 112 adjusts a position of the notch forming cutter blade 111 in the intersection direction D12 and positions the notch forming cutter blade 111 to a position corresponding to the notch depth. With this positioning after the contact detection, a notch corresponding to the notch depth is formed in the coated electric wire 2. The notch forming movement mechanism 112 according to the present embodiment includes a servo motor 112*a* as a driving source, wherein the servo motor 112*a* is capable of precise driving. Furthermore, the notch forming movement mechanism 112 includes a cutter coupling frame 112*b* which is driven by the servo motor 112*a* in the intersection direction D12, wherein the notch forming cutter blade 111 is pivotably mounted to a tip end of the cutter coupling frame 112*b* facing the coated electric wire 2. The notch forming movement mechanism 112 moves the notch forming cutter blade 111 precisely by means of the servo motor 112*a* through the cutter coupling frame 112*b* to move the notch forming cutter blade 111 into the outer circumferential surface 2*a* of the coated electric wire 2 to the specified notch depth.

As described above, the contact detecting section 113 is configured to detect contact of the notch forming cutter blade 111 with the metal foil 24. This contact detection is performed based on whether or not a current flows from the power supply 13*b* connected by the power supply connecting part 13 as described later by forming an electric circuit CR1 by contact between the metal foil 24 and the notch forming cutter blade 111. The detection of the current by the contact detecting section 113 may be performed by detecting the current through the electric circuit CR1 with a current meter or another sensor. The detection may also performed by opening/closing contacts of a relay with a current flow. For the current detection, various conventional detection methods may be used.

The power supply connecting part 13 is configured to connect the power supply 13*b* to the metal foil 24 in the coated electric wire 2 in a connecting position P12 located on a side of the coated electric wire 2 closer to its tip than a notch forming position P11 of the coated electric wire 2 for forming the one or more notches therein by the cutting mechanisms 11. This power supply connecting part 13 includes the power supply 13*b* and a power supply mechanism part 13*a* for connection of the power supply 13*b* to the metal foil 24 (outermost conductor) of the coated electric wire 2.

The power supply 13*b* is a DC power supply connected to the notch forming cutter blade 111 of each of the three cutting mechanisms 11 and the power supply mechanism part 13*a*. A negative side of the power supply 13*b* is connected to the notch forming cutter blade 111, wherein a positive side of the power supply 13*b* is connected to the power supply mechanism part 13*a*.

The power supply mechanism part 13*a* includes a power supply cutter blade 131 and a power supply movement mechanism 132. The power supply cutter blade 131 is a disc-shaped cutting element which is substantially similar to the notch forming cutter blade 111. The power supply movement mechanism 132 includes a power supply connecting frame 132*b* as described below, wherein the power supply cutter blade 131 is mounted to the power supply connecting frame 132*b* so as to be rotatable around a cutter axis 131*a*, the cutter axis 131*a* extending along the electric wire axis 2*b* and intersecting the intersection direction D12.

The power supply movement mechanism 132 is configured to move the power supply cutter blade 131 in the intersection direction D12 intersecting the outer circumferential surface 2*a* of the coated electric wire 2. The power supply movement mechanism 132 moves the power supply cutter blade 131 in this intersection direction D12 so that the power supply cutter blade 131 cuts in the outer circumferential surface 2*a* and thus comes into contact with the metal foil 24 (outermost conductor). According to the present embodiment, the power supply movement mechanism 132 includes a servo motor 132*a* as a driving source, wherein the servo motor 132*a* is capable of precise driving. Furthermore, the power supply movement mechanism 132 includes a power supply coupling frame 132*b* which is driven by the servo motor 132*a* in the intersection direction D12, wherein the power supply cutter blade 131 is pivotably mounted to a tip end of the power supply coupling frame 132*b* facing the coated electric wire 2. The power supply movement mechanism 132 moves the power supply cutter blade 131 precisely by means of the servo motor 132*a* through the power supply coupling frame 132*b* so that the power supply cutter blade 131 intrudes into the coated electric wire 2 to the metal foil 24 and comes into contact therewith. This contact between the power supply cutter blade 131 and the metal foil 24 connects the power supply 13*b* to the metal foil 24.

When the notch forming cutter blade 111 of each of the cutting mechanisms 11 cuts in to the metal foil 24 with the power supply 13*b* being connected to the metal foil 24, the electric circuit CR1 is formed which includes the power supply connecting part 13, the metal foil 24 and the notch forming cutter blade 111, whereby a current flows through the electric circuit CR1. The contact between the notch forming cutter blade 111 of each of the cutting mechanisms 11 and the metal foil 24 is detected by the fact that the current is detected by the contact detecting section 113. After this detection, the notch forming movement mechanism 112 adjusts a position of the notch forming cutter blade 111 in each cutting mechanism 11 to position it to a position corresponding to the specified notch depth so that a notch at the notch depth is formed in the coated electric wire 2.

In a state where the notches have been formed for the three cutting mechanisms 11, the rotation mechanism 12 rotates the notch forming mechanism parts 11*a* around the electric wire axis 2*b* to extend the notches in a direction around the electric wire axis 2*b* so that the stripped region corresponding to the specified notch depth is removable.

Next, a method for forming a notch for stripping will be described in which a notch for stripping is formed at a terminal of the coated electric wire 2 by using the device 1 for forming a notch for stripping as described above. Although the following description includes repetition of some of the above description, the following description will be made with reference to other figures.

Figure 5:
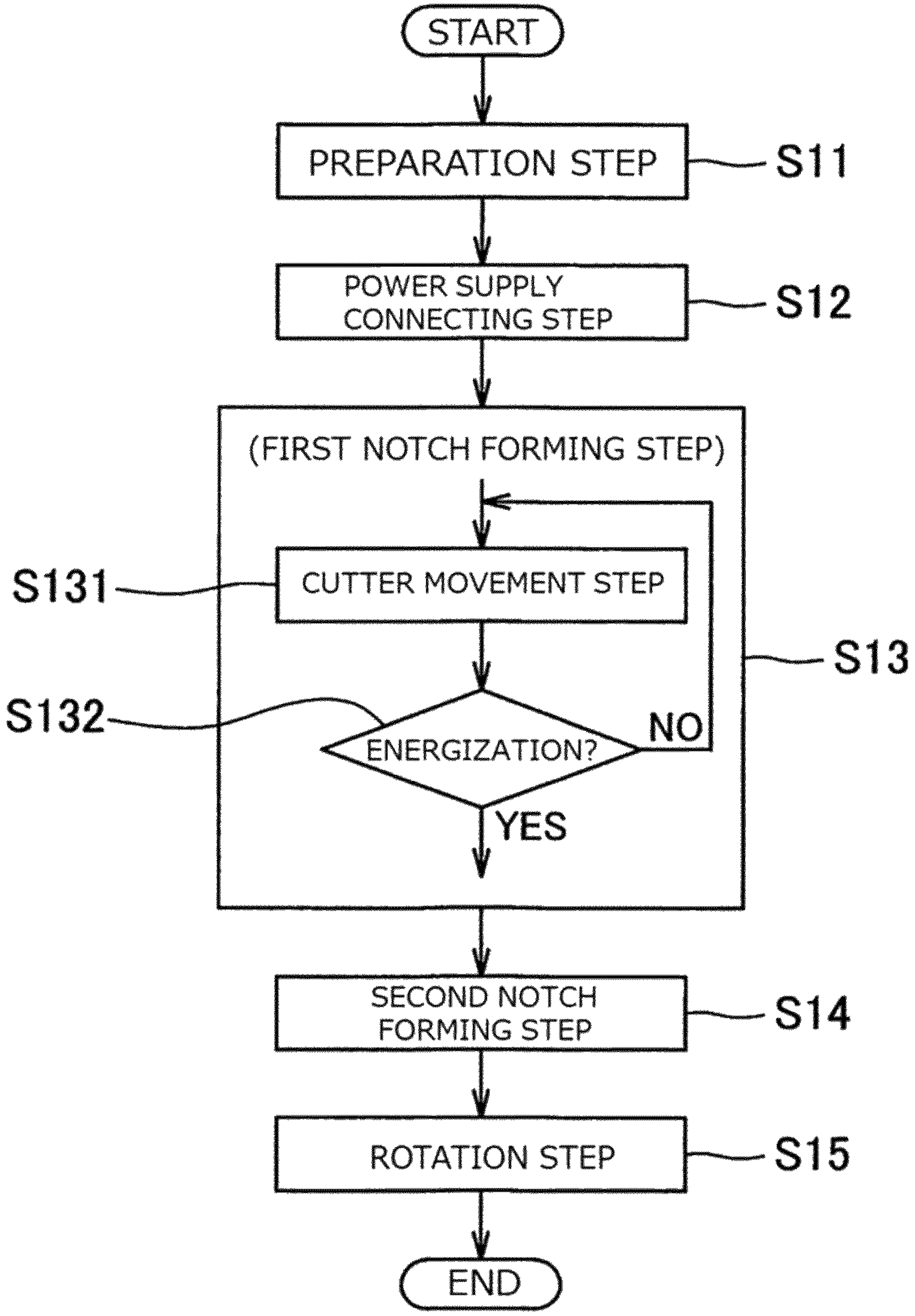
FIG. 5 shows a schematic flowchart illustrating a flow of a series of processes of a method for forming a notch for stripping at a terminal of a coated electric wire by means of the device for forming a notch for stripping as shown in FIG. 1
Figure 6:
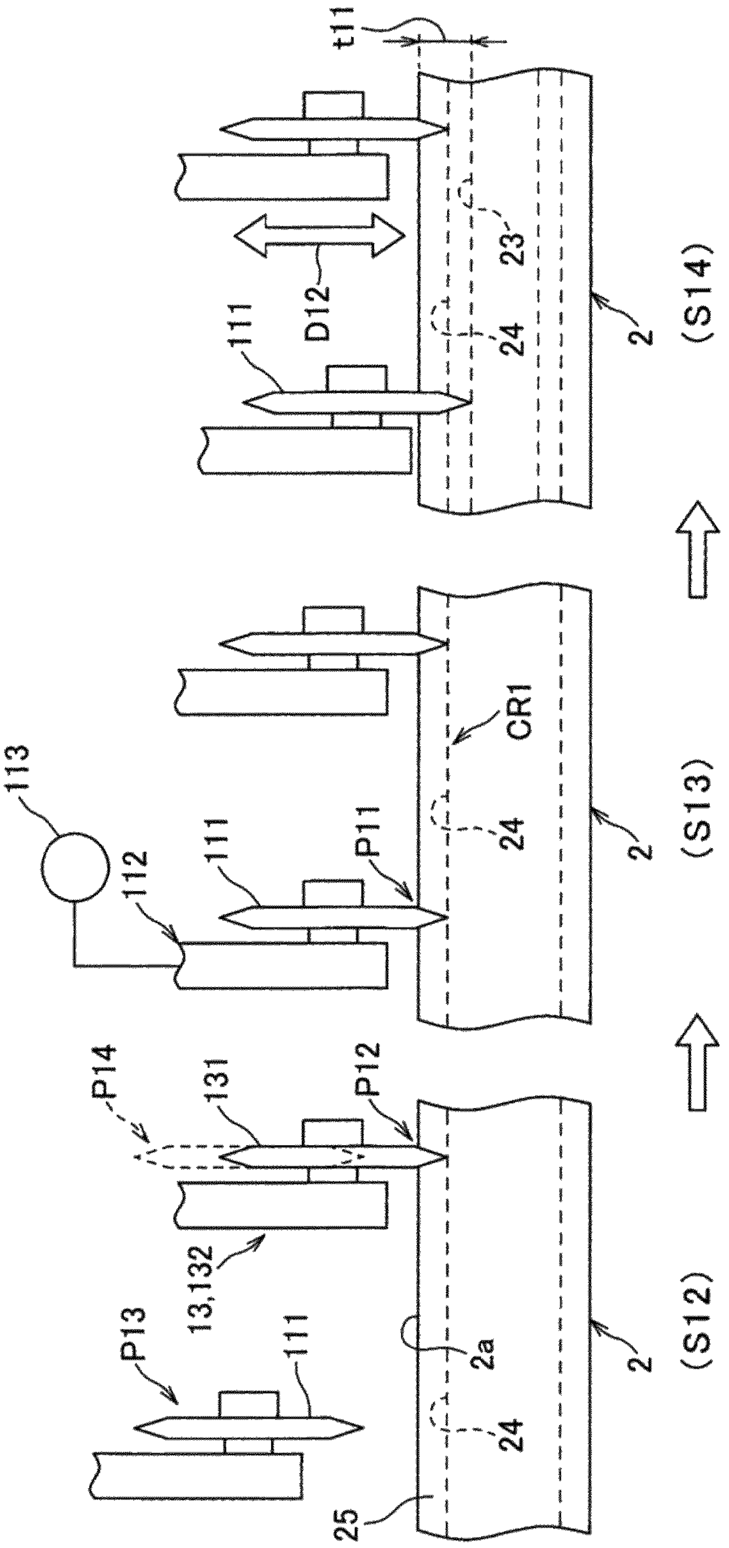
FIG. 6 shows an explanatory view for explanation of some of the processes of the method for forming a notch for stripping according to FIG. 5 by means of a peripheral structure around the notch forming cutter blades and power supply cutter blade as shown in the side view of FIG. 4.

FIG. 5 shows a schematic flowchart illustrating a flow of a series of processes of a method for forming a notch for stripping at a terminal of the coated electric wire by means of the device for forming a notch for stripping as shown in FIG. 1. FIG. 6 shows an explanatory view for explanation of some of the processes of the method for forming a notch for stripping according to FIG. 5 by means of a peripheral structure around the notch forming cutter blades and power supply cutter blade as shown in the side view of FIG. 4.

The process of the method for forming a notch for stripping according to FIG. 5 is started when the coated electric wire 2 is prepared in which a notch is formed. When the series of processes is started, a preparation step S11 is first performed. At the preparation step S11, the coated electric wire 2 is placed in the device 1, and the three notch forming cutter blades 111 are positioned in an initial position P13, wherein the initial position P13 is spaced away from the outer circumferential surface 2*a* of the coated electric wire 2. Further, in the present embodiment, in this preparation step S11, one power supply cutter blade 131 is also positioned in the initial position P14 away from outer circumferential surface 2*a*.

Following the preparation step S11, the power supply connecting step S12 by the power connection unit 13 is executed. In the power supply connecting step S12, the power supply connection unit 13, the power supply 13*b* is connected at the connection position P12 of the distal end in the coated electric wire 2. Connecting the power 13*b*, as described above, the moving mechanism 132 for power supply is performed by cutting the power cutter blade 131 from outer circumferential surface 2*a* to the metallic foil 24. Cutting amount of the power supply cutter blade 131 at this time has a notch amount which is set in advance in accordance with the thickness of the outermost coating 25.

Next, the first notch forming step S13 in which the notch forming movement mechanism 112 moves the notch forming cutter blades 111 as follows is performed. In this first notch forming step S13, the cutter-moving step S131 in the notch forming position P11 and the contact-determination step S132 based on the current detection in the electric-circuit CR1 are repeatedly performed. In the contact determination step S132, the contact detection unit 113, whether or not a current flows through the electric circuit CR1 by energization due to contact between the notch forming cutter blade 111 and the metal foil 24 is determined. If the current is not detected (NO determination), the cutter moving process S131 is repeated since the notch forming cutter blade 111 is not in contact with the metal foil 24 as the outermost conductor. If the current is detected (YES determined), since the notch forming cutter blade 111 is in contact with the metal foil 24, the process proceeds to the subsequent second notch forming step S14.

In the second notch forming step S14, after the contact between the notch forming cutter blade 111 and the metal foil 24 is detected by the contact detecting unit 113, the position of the notch forming cutter blade 111 in the intersection direction D12 is adjusted, the notch is positioned to a position corresponding to the specified depth of cut t11. As described above, when the specified depth of cut t11 is up to the metallic foil 24, the notch forming cutter blade 111 is stopped moving at the contact-detection point. Further, if the depth of cut t11 is up to the braid 23, the notch forming cutter blade 111 after the cutting cutter blade 111 from the contact-detection point is fed by the thickness of the metal foil 24 is moved is stopped. In the second notch forming step S14, the position of the notch forming cutter blade 111 is adjusted for forming a notch after the contact-detection of the notch forming cutter blade 111 and the metal foil 24 is performed.

After the second notch forming step S14 has been performed for each of the three cutting mechanisms 11, the notches are finally extended according to a rotation step S15. At the rotation step S15, the notch forming mechanism parts 11*a* of the three cutting mechanisms 11 are rotated by an angle greater than or equal to 120° around the electric wire axis 2*b* by the rotation mechanism 12 in a state of the notch forming mechanism parts 11*a* which have formed the notches in the coated electric wire 2. With this rotation, the notches at the three locations are extended in the direction around the electric wire axis 2*b* to be connected to each other so that at a terminal of the coated electric wire 2, one notch is formed which extends over the entire circumference of the coated electric wire 2 in the direction around the electric wire axis 2*b*. Forming this notch over the entire circumference makes the stripped region corresponding to the specified notch depth t11 removable, wherein the series of processes of the method for forming a notch for stripping is ended here. After this, the removable stripped region is removed to expose an inner portion thereof. The stripped region may be removed manually by an operator, or may be removed by using a dedicated removal device.

The device 1 and method for forming a notch for stripping according to the above-described embodiment may have one or more effects as follows: According to the present embodiment, for forming one or more notches for stripping by the notch forming cutter blade 111, the contact between the metal foil 24 (outermost conductor) and the notch forming cutter blade 111 is detected based on the current flowing through the electric circuit CR1 including the power supply connecting part 13, metal foil 24 and the notch forming cutter blade 111. After the detection, the position of the notch forming cutter blade 111 is adjusted to position the notch forming cutter blade 111 to a position corresponding to the specified notch depth t11 for forming one or more notches at the notch depth t11. According to this configuration, the notch forming cutter blade 111 is subsequently forwarded starting from a position as a reference in which the notch forming cutter blade 111 has actually come into contact with the metal foil 24 of the coated electric wire 2. By defining the reference for forwarding as described above, it is possible to suppress impact of accumulated thickness tolerances for individual coating materials and to thus improve the accuracy for notch forming, even for forming a notch in a thick electric wire. Furthermore, even for a coated electric wire 2 with deformation and/or misalignment which is caused by winding and storing it around a bobbin, impact of the deformation and/or alignment may be suppressed to improve the accuracy for notch forming because the notch forming cutter blade 111 is forwarded after actually bringing the notch forming cutter blade 111 into contact with the metal foil 24. In this manner, the present embodiment may enable the accuracy for notch forming to be improved in the case of forming a notch in a thick electric wire and/or a coated electric wire 2 wound around a bobbin for storage. Furthermore, for a thick electric wire, the specified notch depth t11 may be variably selected as appropriate according to the present embodiment, which allows one or more notches to be formed to a desired coating material without changing a device structure, wherein the desired coating material may be selected within a wide range.

Here, according to the present embodiment, the notch forming movement mechanism 112 includes the servo motor 112*a* and is configured to move the notch forming cutter blade 111 by means of the servo motor 112*a*. This configuration may enable the accuracy for notch forming to be further improved by precisely moving the notch forming cutter blade 111 with the servo motor 112*a*.

Further, in the present embodiment, the power connection unit 13 includes a conductive power supply cutter blade 131 which is electrically connected to the power supply 13*b*, the power supply for the cutter blade 131 is moved and a power moving mechanism 132 for contacting the metal foil 24 by cutting into outer circumferential surface 2*a*. According to this configuration, by contacting the metal foil 24 by cutting the power supply cutter blade 131 on outer circumferential surface 2*a* of the coated electric wire 2, it is possible to effectively connect the power supply 13*b*. At this time, the connection position P12 of the power supply 13*b* by the cutting of the power supply cutter blade 131 is at the distal end side than the cutting position P11 by the cutting mechanism 11, since after stripping becomes the object of cutting or the like, consideration of the notch marks at the time of wire connection is not required.

Further, in the present embodiment, the power supply movement mechanism 132 has a servo motor 132*a*, to move the power cutter blade 131 by the servo motor 132*a*. According to this configuration, by precisely moving the power supply cutter blade 131 by the servo motor 132*a*, it is possible to further improve the cutting accuracy for the power supply connection.

It is to be noted that the embodiment as described above merely shows representative configurations for the device and method for forming a notch for stripping. The device and method for forming a notch for stripping are not limited thereto, but may be modified and implemented in various manners.

For example, the above-described embodiment shows the coated electric wire 2 to be used e.g. for a high-voltage wire harness for an automobile as an example of a coated electric wire in which a notch for stripping is formed. However, the coated electric wire to which notch forming is applied is not limited thereto, but the coated electric wire may be used in any specific manner.

As an example of a coated electric wire in which a notch for stripping is formed, the above-described embodiment further shows the coated electric wire 2 in the form of a thick electric wire including the conductive core 21 covered with the plurality of layers of coating materials. As examples of the plurality of layers of coating materials as mentioned above, the present embodiment shows the inner coating 22 of an insulating resin, the conductive braid 23, the conductive metal foil 24, and the outermost coating 25 of an insulating resin. However, the coated electric wire for which notch forming is applied is not limited thereto, but may include a core covered with a single layer of a resin coating, and e.g. any specific layer structure may be used for the plurality of layers of coating materials, even for a thick electric wire. In the case of a simple coated electric wire including the core covered with a single layer of a resin coating, the core is the outermost conductor at the smallest depth from the outer circumferential surface.

As an example of the cutting mechanism, the above-described embodiment shows the three cutting mechanisms 11 including the three notch forming mechanism parts 11*a* in a one-to-one manner, i.e., with one of the mechanism parts 11*a* being associated to each of the cutting mechanisms 11, wherein the notch forming mechanism parts 11*a* are arranged around the electric wire axis 2*b* of the coated electric wire 2 at an interval of an angle of 120°. However, the cutting mechanism is not limited thereto, but any specific number of cutting mechanisms and any specific arrangement may be selected for the cutting mechanism, provided that one or more mechanism parts are arranged around the electric wire axis of the coated electric wire.

As an example of the notch forming movement mechanism, the above-described embodiment further shows the notch forming movement mechanism 112 which moves the notch forming cutter blade 111 by means of the servo motor 112*a*. However, the notch forming movement mechanism is not limited thereto, but e.g. a motor or cylinder mechanism which is commonly used as a driving source may be selected. However, the accuracy for notch forming may be further improved by using the servo motor 112*a* as a driving source for the notch forming movement mechanism 112, as described above.

Further, in the embodiment described above, as an example of the power supply connecting part, the power supply connecting part 13 for connecting the electric wire 13*b* by contacting the metallic foil 24 (outermost conductor) is cut into the outer circumferential surface 2*a* power supply movement mechanism 132 a power cutter blade 131 connected to the power 13*b* is exemplified. However, the power connection is not limited to this, the outermost conductor of the coated electric wire, as long as the power supply is connected at a position closer to the tip end than the cutting position by the cutting mechanism, the specific connection mechanism can adopt any mechanisms. However, by contacting the metal foil 24 by cutting the power supply cutter blade 131 to outer circumferential surface 2*a* of the coated electric wire, it is possible to effectively connect the power supply 13*b* as described above.

Further, in the embodiment described above, as an exemplary power movement mechanism, a power supply movement mechanism 132 for moving the power supply cutter blade 131 by a servo motor 132*a* is exemplified. However, the moving mechanism for power supply is not limited to this, it may be adopted a common motor or cylinder mechanism or the like as a driving source. Unlike the notch forming movement mechanism described above, if the power supply cutter blade for the movement mechanism securely contacts the outermost conductor of the coated electric wire, it is acceptable even if somewhat bite into the structure of the inner. For this reason, the possibility of adopting a general motor or cylinder mechanism for the power supply movement mechanism is higher than that for the depth of notch forming movement mechanism. However, in the power supply movement mechanism 132, it is possible to further improve the cutting accuracy of the power supply connection by employing a servo motor 132*a* to driving source as described above.

REFERENCE SIGNS LIST

1 Device for forming a notch for stripping
2 Coated electric wire
2*a* Outer circumferential surface
2*b* Electric wire axis
11 Cutting mechanisms
11*a* Notch forming mechanism parts
12 Rotation mechanism
13 Power supply connecting part
13*a* Power supply mechanism part
13*b* Power supply
21 Core
22 Inner coating
23 Braid
24 Metal foil
25 Outermost coating
111 Notch forming cutter blades
111*a*, 131*a* Cutter axis
112 Notch forming movement mechanism
112*a*, 132*a* Servo motor
112*b* Cutter coupling frame
113 Contact detecting section
131 Power supply cutter blade
132 Power supply movement mechanism
132*b* Power supply connecting frame
CR1 Electric circuit
D11 Cutting rotating direction
D12 Intersection direction
P11 Notch forming position
P12 Connecting position
P13, P14 Initial positions
S11 Preparation step
S12 Power supply connecting step
S13 First notch forming step
S14 Second notch forming step
S15 Rotation step
S131 Cutter movement step
S132 Contact determination step
t11 Notch depth

What is claimed is:

1. A device for forming a notch for stripping, comprising:

one or more cutting mechanisms configured to be arranged around an electric wire axis of a coated electric wire, wherein the coated electric wire includes a core covered with an insulating layer or covered with the insulating layer and one or more conductive layers, wherein the one or more conductive layers are layered inside the insulating layer, wherein each of the one or more cutting mechanisms is configured to form one or more notches in the coated electric wire to a specified notch depth starting from an outer circumferential surface of the coated electric wire; and a rotation mechanism configured to rotate the one or more cutting mechanisms around the electric wire axis so that the one or more notches extend in a direction around a circumference of the electric wire axis which allows a stripped region corresponding to the notch depth to be removed; and a power supply connecting part which is configured to connect a power supply to an outermost conductor in the coated electric wire in a connecting position located on a side of the coated electric wire closer to a tip of the coated electric wire than a notch forming position of the coated electric wire for forming the one or more notches therein by the one or more cutting mechanisms, the outermost conductor being located at a smallest depth from the outer circumferential surface in the coated electric wire;

wherein each of the one or more cutting mechanisms includes:

an electrically conductive notch forming cutter blade which is movable in an intersection direction intersecting the outer circumferential surface;

a contact detecting section including a current sensor configured to detect a contact between the outermost conductor and the notch forming cutter blade based on a current through an electric circuit including the power supply connecting part, the outermost conductor and the notch forming cutter blade; and a notch forming movement mechanism configured to move the notch forming cutter blade in the intersection direction, wherein upon detecting the contact by the contact detecting section during movement of the notch forming cutter blade, the notch forming movement mechanism is configured to adjust a position of the notch forming cutter blade in the intersection direction and position the notch forming cutter blade to a position corresponding to the notch depth for forming one or more notches therein, wherein the power supply connecting part includes a power supply mechanism part, the power supply mechanism part configured to connect the power supply to the outermost conductor, wherein the power supply mechanism part includes:

an electrically conductive power supply cutter blade which is configured to be electrically connected to the power supply and movable in the intersection direction; and a power supply movement mechanism configured to move the power supply cutter blade in the intersection direction so that the power supply cutter blade cuts in the outer circumferential surface and thus comes into contact with the outermost conductor.

2. The device according to claim 1, wherein the notch forming movement mechanism includes a servo motor, and wherein the notch forming movement mechanism is configured to move the notch forming cutter blade by means of the servo motor.

3. The device according to claim 1, wherein the power supply connecting part includes the power supply.

4. The device according to claim 1, wherein the power supply movement mechanism includes a servo motor, and wherein the power supply movement mechanism is configured to move the power supply cutter blade by means of the servo motor.

5. A method for forming a notch for stripping comprising:

a preparation step of placing the coated electric wire in the device according to claim 1 and positioning the notch forming cutter blade in an initial position by means of the device, wherein the initial position is spaced away from the outer circumferential surface in the intersection direction;

a power supply connecting step of connecting the power supply to the outermost conductor on the side of the coated electric wire closer to a tip of the coated electric wire by means of the power supply connecting part;

a first notch forming step of moving the notch forming cutter blade until the contact between the notch forming cutter blade and the outermost conductor is detected based on the current;

upon detecting the contact by the contact detecting section during movement of the notch forming cutter blade according to the first notch forming step, a second notch forming step of adjusting the position of the notch forming cutter blade in the intersection direction and positioning the notch forming cutter blade to a position corresponding to the notch depth for forming one or more notches therein; and a rotation step of rotating the one or more cutting mechanisms around the electric wire axis and thus extending the one or more notches in the direction around the electric wire axis allowing the stripped region to be removed.

* * * * *